P. W. GATES.
Evaporating Pan.
No. 36,881.
Patented Nov. 4, 1862.
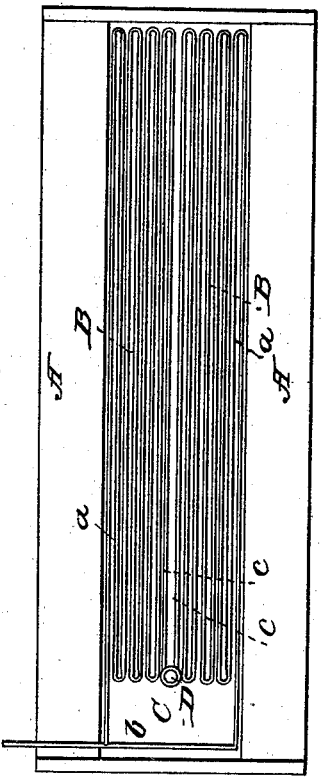
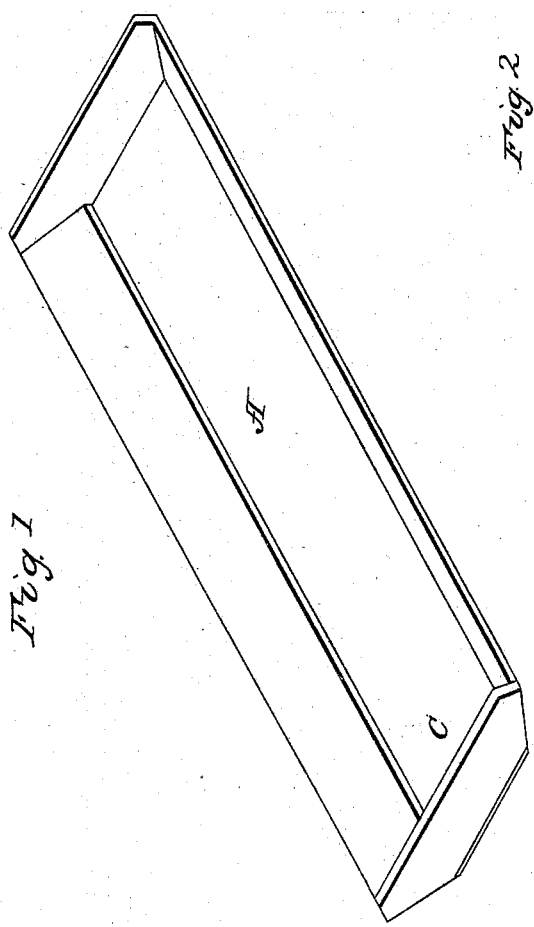
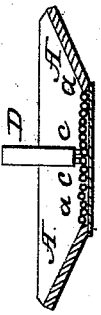
Witnesses
Gustave Dietrich
Dellie C Faunce
Inventor
P. W. Gates
by
Mason, Fenwick & Lawrence
Attys

UNITED STATES PATENT OFFICE.

P. W. GATES, OF CHICAGO, ILLINOIS, ASSIGNOR TO HIMSELF, THOMAS CHALMERS, AND D. R. FRASER, ALL OF SAME PLACE.

IMPROVEMENT IN EVAPORATING-PANS FOR SACCHARINE LIQUIDS.

Specification forming part of Letters Patent No. 36,881, dated November 4, 1862.

*To all whom it may concern:*

Be it known that I, P. W. GATES, of Chicago, in the county of Cook and State of Illinois, have invented a new and useful Improvement in Evaporating - Pans for Sugar and Sirup Juices; and I do hereby declare that the following is a full, clear, and exact description of the same, reference being had to the accompanying drawings, forming part of this specification, in which—

Figure 1 is a perspective view of an evaporating-pan adapted to the use of my improvement. Fig. 2 is a plan of my invention applied to the pan. Fig. 3 is a transverse section of the same.

The nature of my invention consists in a steam-coil apparatus so constructed that when applied to a pan with rectangular bottom a defecating-apartment at one end of the pan will be formed, and thus the necessity of widening the bottom of the pan near one end for that purpose is obviated.

To enable others skilled in the art to make and use my invention, I will proceed to describe the same with reference to the drawings.

A is an evaporator-pan, with oblong bottom, inclined sides, and vertical ends. This construction of pan I prefer, as it affords broad beaches for scum and feculent matter thrown off by the juices to deposit upon; but any other suitable form of pan may be adopted, so long as the same will enable the juice to be evaporated effectually by steam without the aid of flame.

B B are two steam-coils, of less surface in length than the surface-length of the bottom of the pan—say about in the proportion represented in the drawings, Fig. 2. These coils run back and forward, commencing at the center of the pan and extending laterally in opposite directions till they reach the side margins of the bottom of the pan. The last bends, *a a*, of the coils extend along the whole length of the pan, including defecating-surface C, and terminate and unite in a transverse portion of pipe, *b*, which runs along the front end board of the pan, as shown. The central or induction bends, *c c*, of the coils, as well as all the other bends, excepting the exhaust-bends *a a*, being shorter than the pan, a defecating-space, C, is formed of the forward end portion of the pan-bottom when the coils are laid on the bottom of the pan, as represented.

D is a common supply-pipe leading from a steam-generator. The vertical ends of the bends *c c* of the coils unite in this pipe, and thus both coils are supplied from the same source. The receiving ends of the coils, as well as the exhaust ends, are to be furnished with appropriate cocks to regulate the supply and exhaust of steam.

In practice one coil, B, might be used in a pan; but in that case one side of the pan should be vertical and the other inclined.

From the foregoing description it will be seen that very little heat comes upon the juice while it is in the defecating-apartment C—that is, the juice is not heated to the boiling-point. Therefore as fast as the juice enters this apartment a very perfect defecation will be experienced, and the green scum and deleterious matter will be thrown off before it is boiled into the juice. This matter being prevented from flowing into the cleansing part A of the pan by reason of a strong ebullition setting in, the operator has an opportunity to skim it off or throw it upon the beaches formed by the inclined sides. The further action of the coils upon the juice is to heat it intensely, so as to produce violent ebullition at the points *c c*, where the steam first circulates through them, and thus effect an equable and complete deposit of all remaining scum and foreign substances upon the beaches formed by the inclined sides. If but one beach and one coil are used, the steam will heat the juice hottest near the vertical side of the pan and compel the scum to flow toward the inclined side.

It would not alter the effect of my invention materially if the ends of the pan were carried round circularly; but as the rectangular form is the most convenient for manufacture, I prefer that form.

When the juice has been evaporated to the extent necessary, it is drawn off gradually while a fresh supply is flowing in. The supply is at the head of the pan and the discharge at the foot. In order to maintain the flow, the pan should be set slightly inclined, so as to have the discharge end the lowest.

What I claim as my invention, and desire to secure by Letters Patent, is—

The steam-coil evaporator, with the defecating-apartment C, substantially in the manner and for the purpose described.

P. W. GATES.

Witnesses:
J. L. FARGO,
WILL A. BALL.